US010224733B2

(12) United States Patent
Toguchi

(10) Patent No.: US 10,224,733 B2
(45) Date of Patent: Mar. 5, 2019

(54) ELECTRONIC DEVICE AND METHOD OF CONTROLLING ELECTRONIC DEVICE

(71) Applicant: CANON KABUSHIKI KAISHA, Tokyo (JP)

(72) Inventor: Kazuomi Toguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/280,055

(22) Filed: Sep. 29, 2016

(65) Prior Publication Data

US 2017/0104354 A1    Apr. 13, 2017

(30) Foreign Application Priority Data

Oct. 9, 2015    (JP) .................................. 2015-201587

(51) Int. Cl.
*H02J 7/00*    (2006.01)

(52) U.S. Cl.
CPC .......... *H02J 7/0077* (2013.01); *H02J 7/0029* (2013.01); *H02J 7/0052* (2013.01)

(58) Field of Classification Search
USPC ................................. 320/107, 108, 109, 137
See application file for complete search history.

(56) References Cited

U.S. PATENT DOCUMENTS

2009/0021219 A1*  1/2009  Yoda ....................... H02J 7/025
                                                              320/137
2015/0188346 A1*  7/2015  Oku ....................... H02J 7/0029
                                                              320/107

FOREIGN PATENT DOCUMENTS

JP    2009-273219 A    11/2009

* cited by examiner

*Primary Examiner* — Brian Ngo
(74) *Attorney, Agent, or Firm* — Venable, LLP

(57) ABSTRACT

An electronic device includes a charging unit that charges a battery using power from an external power source, an authentication unit that performs authentication to determine whether the battery is a predetermined battery, a detection unit that detects a voltage of the battery, and a control unit that causes the charging unit to charge the battery with a current not more than a first current value until the voltage of the battery reaches a first predetermined value and causes the authentication unit to operate on power from the battery when the voltage of the battery reaches the first predetermined value. When the voltage of the battery has reached the first predetermined value, the control unit causes the authentication unit to authenticate the battery.

15 Claims, 5 Drawing Sheets

ELECTRONIC DEVICE AND METHOD OF CONTROLLING ELECTRONIC DEVICE

BACKGROUND

Field of the Invention

Aspects of the present invention generally relate to an electronic device which operates on a chargeable battery and a method of controlling the electronic device.

Description of the Related Art

An electronic device which operates on a chargeable battery places importance on the safety of the battery. For example, before starting charging the battery, the electronic device takes safety measures such as authenticating the battery.

When charging the battery in a fully discharged state while an authentication circuit on the battery side does not function, the electronic device cannot activate even its internal circuit because of low voltage. In this case, the electronic device uses an external power source to charge the battery to a level at which the device can activate the internal circuit, thereby making the external power source activate the internal circuit to perform authentication. Japanese Patent Laid-Open No. 2009-273219 discloses a technique of performing authentication using an internal circuit operating on an external power source when an authentication circuit on the battery side is made to function by preliminary charging.

When, however, a battery is authenticated using power supplied from an unidentified external power source, the authentication of the battery cannot be sometimes normally completed depending on the power supply capability of the external power source and responsiveness to the variation in load of the external power source.

SUMMARY

According to an aspect of the present invention, it is possible to overcome drawbacks caused in authentication of a battery.

According to an aspect of the present invention, an electronic device includes: a charging unit that charges a battery using power from an external power source; an authentication unit that performs authentication to determine whether the battery is a predetermined battery; a detection unit that detects a voltage of the battery; and a control unit that causes the charging unit to charge the battery with a current not more than a first current value until the voltage of the battery reaches a first predetermined value and causes the authentication unit to operate on power from the battery when the voltage of the battery reaches the first predetermined value, wherein when the voltage of the battery has reached the first predetermined value, the control unit causes the authentication unit to authenticate the battery.

According to an aspect of the present invention, a method includes: detecting a voltage of a battery; causing a charging unit to charge the battery with a current not more than a first current value until the voltage of the battery reaches a first predetermined value, wherein the charging unit charges the battery using power from an external power source; causing an authentication unit to operate on power from the battery when the voltage of the battery has reached the first predetermined value, wherein the authentication unit performs authentication to determine whether the battery is a predetermined battery; and causing the authentication unit to authenticate the battery, when the voltage of the battery has reached the first predetermined value.

According to an aspect of the present invention, a non-transitory storage medium that stores a program causing a computer to execute a method, the method including: detecting a voltage of a battery; causing a charging unit to charge the battery with a current not more than a first current value until the voltage of the battery reaches a first predetermined value, wherein the charging unit charges the battery using power from an external power source; causing an authentication unit to operate on power from the battery when the voltage of the battery has reached the first predetermined value, wherein the authentication unit performs authentication to determine whether the battery is a predetermined battery; and causing the authentication unit to authenticate the battery, when the voltage of the battery has reached the first predetermined value.

Further features and aspects of the present invention will become apparent from the following description of exemplary embodiments.

DESCRIPTION OF THE EMBODIMENTS

Exemplary embodiments, features, and aspects of the present invention will be described below with reference to the drawings. However, aspects of the present invention are not limited to the following embodiments.

First Embodiment

Figure 1A:
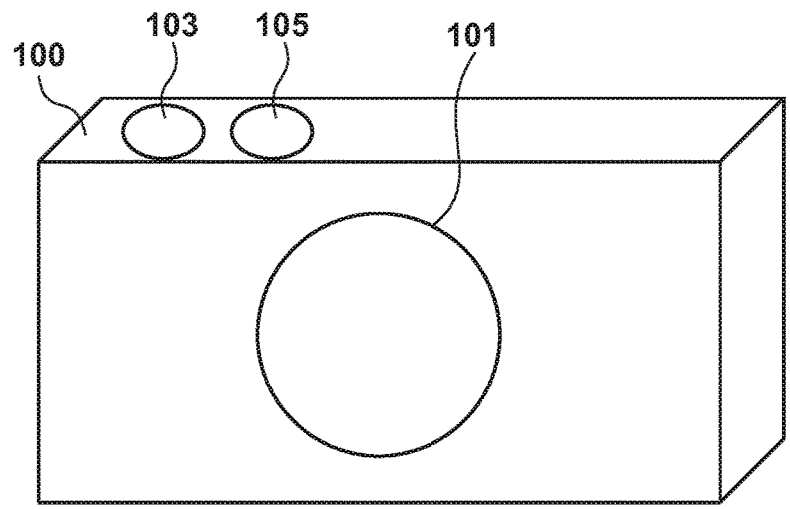
FIG. 1A is a perspective view illustrating an example of the outer appearance of an electronic device 100 according to the first embodiment.
Figure 1B:
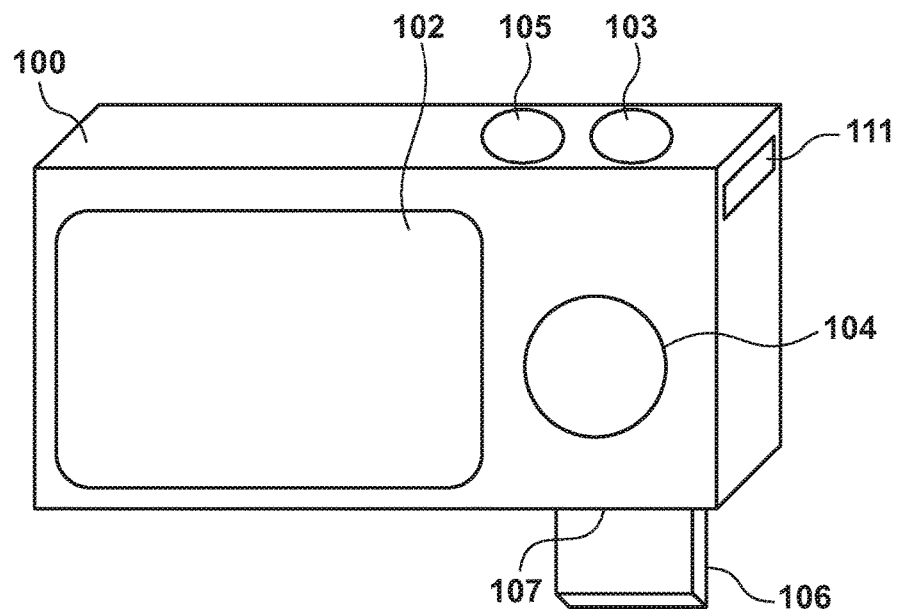
FIG. 1B is a perspective view illustrating another example of the outer appearance of an electronic device 100 according to the first embodiment.

FIGS. 1A and 1B are perspective views each illustrating an example of the outer appearance of an electronic device 100 according to the first embodiment. FIG. 1A is a perspective view illustrating the electronic device 100 when viewed from front. FIG. 1B is a perspective view illustrating the electronic device 100 when viewed rear. The first embodiment will exemplify a case in which an image capture apparatus in which the electronic device 100 acts as, for example, a digital camera. However, the electronic device 100 is not limited to a digital camera. The electronic device 100 may be, for example, a portable terminal, mobile phone, or notebook PC.

An imaging optical system 101 includes a lens and a shutter and forms an optical image on the light-receiving surface of an image sensor such as a CCD sensor. A display unit 102 includes, for example, a liquid crystal display, and displays an image or information under the control of a system control unit 207 (see FIG. 2). A shutter button 103 is a member for issuing an image capture instruction. An instruction input unit 104 includes various types of switches and buttons and a touch panel for receiving instructions from the user. A power switch 105 is a member which turns on and off the power of the electronic device 100 in accordance with a user operation. A battery 106 is a chargeable battery, which can communicate with the electronic device 100. A first connection unit 107 electrically connects the battery 106 to the electronic device 100. A second connection unit 108 is an external power source connection unit and receives power supplied from an external power source via a wired connection or wireless connection. For example, the second connection unit 108 is an interface conforming to Universal Serial Bus (USB) standard.

Figure 2:
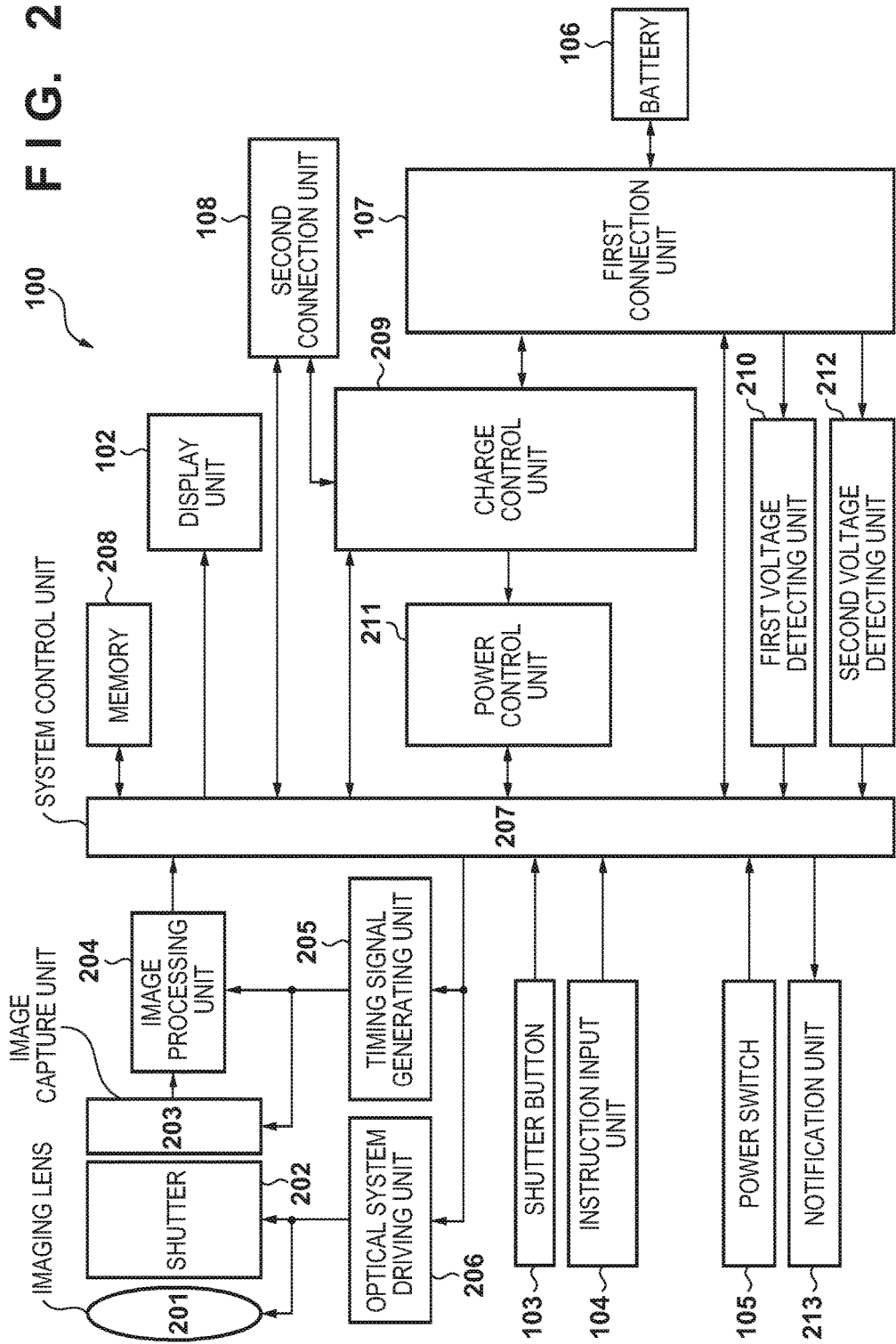
FIG. 2 is a block diagram illustrating an example of components of the electronic device 100 according to the first embodiment.

FIG. 2 is a block diagram illustrating an example of components of the electronic device 100 according to the first embodiment.

Referring to FIG. 2, an imaging lens 201 and a shutter 202 are included in the imaging optical system 101. An image capture unit 203 includes an image sensor (a CCD sensor or the like), a correlation double sampling unit, a programmable gain amplification unit, and an analog/digital converter, and generates image data from an optical image. An image processing unit 204 performs a predetermined image process to the image data generated by the image capture unit 203. A timing signal generation generating unit 205 generates timing signals for operating the image capture unit 203 and the image processing unit 204. An optical system driving unit 206 operates the imaging lens 201 and the shutter 202 under the control of the system control unit 207.

The system control unit 207 controls the overall electronic device 100. An image signal from the image processing unit 204 is written in a memory 208 via the system control unit 207. The memory 208 stores image data obtained by the image capture unit 203 and converted into digital data by the image processing unit 204 and image data to be displayed on the display unit 102. The memory 208 has a storage capacity large enough to store a predetermined number of still images and a moving image and sound of a predetermined time. The system control unit 207 superimposes predetermined data on image display data stored in the memory 208 as needed, and supplies the resultant data to the display unit 102. The display unit 102 such as a liquid crystal display displays the display image data written in the memory 208.

The shutter button 103 and the instruction input unit 104 are members for inputting instructions from the user to the system control unit 207. In response to an image capture preparation instruction signal generated when the shutter button 103 is pressed half, the system control unit 207 starts an AF (auto focus) process, AE (auto exposure) process, AWB (auto white balance) process, and the like. In response to an image capture instruction signal generated when the shutter button 103 is pressed fully, the system control unit 207 instructs the image capture unit 203 to start image capturing. Image data generated by the image capture unit 203 is stored in a storage medium (a memory card or the like) connected to the electronic device 100.

The system control unit 207 has a battery authentication function of determining whether a battery connected via the first connection unit 107 is a predetermined battery, and transmits a result of the battery authentication to a charge control unit 209. In this case, the predetermined battery is a battery guaranteed to normally execute the operation of the electronic device 100. If the battery authentication has succeeded, the system control unit 207 determines that the battery 106 is the predetermined battery. The second connection unit 108 connects the electronic device 100 to an external device by wired connection or wireless connection. The electronic device 100 can receive power from the connected external device via the second connection unit 108. For example, if the second connection unit 108 is a USB connector, the electronic device 100 can receive power from the external device and perform data communication with the external device via a USB cable connected to the second connection unit 108. This data communication includes communication data such as image data and enumeration data.

Figure 4:
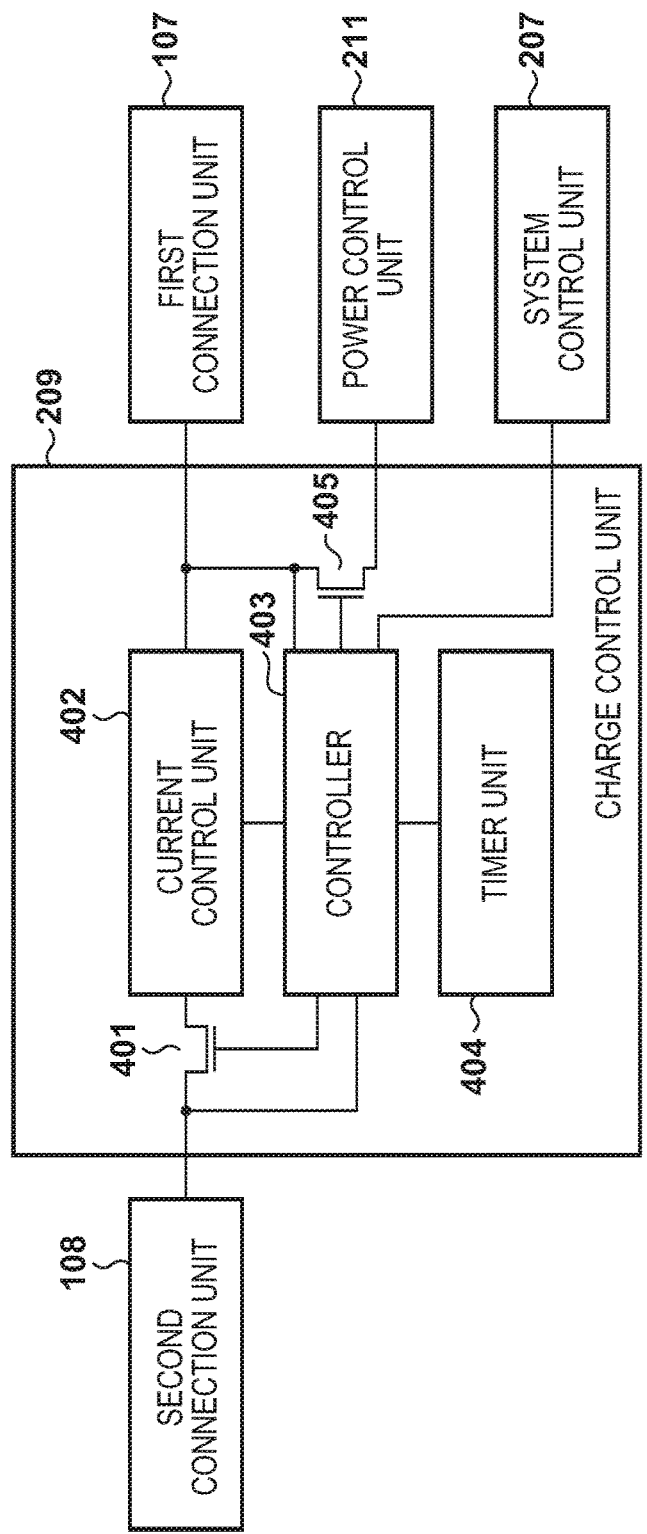
FIG. 4 is a block diagram illustrating an example of components of a charge control unit 209 according to the first embodiment.

The charge control unit 209 controls the charging of the battery 106 connected to the first connection unit 107. FIG. 4 illustrates an example of components of the charge control unit 209. A controller 403 is a controller for the charge control unit 209, and operates on power supplied from the second connection unit 108 or power from the battery 106 connected to the first connection unit 107. The controller 403 communicates with the system control unit 207 to control a connection switch 401, a current control unit 402, a timer unit 404, and a connection switch 405.

The connection switch 401 is controlled in an ON or OFF state by the controller 403. When the connection switch 401 is in the ON state, the second connection unit 108 and the battery connected to the first connection unit 107 are connected to each other via the current control unit 402, and the battery 106 is ready to be charged by power supplied from the second connection unit 108. The current control unit 402 controls a current supplied from the external device connected to the second connection unit 108. The current control unit 402 controls a charging current in accordance with the battery authentication result received from the system control unit 207.

If the battery authentication has not been performed with respect to the connected battery 106, the controller 403 controls the current control unit 402 to charge the battery 106 with a charging current whose maximum value is a first current value. If the authentication of the battery 106 has succeeded, the controller 403 controls the current control unit 402 to charge the battery 106 with a charging current whose maximum value is a second current value. If the authentication of the battery 106 has failed, the controller 403 controls the current control unit 402 to charge the battery 106 with a charging current whose maximum value is a third current value. The charging current whose maximum value is the first current value is a charging current determined in consideration of the safety of the battery 106. The charging current whose maximum value is the second current value is a charging current capable of quickly charging (fast charging) the battery 106. The second current value is therefore larger than the first current value. A charging current whose maximum value is the third current value is a charging current to be used when the battery 106 is not the predetermined battery (when the battery authentication has failed). The charging current whose maximum value is the third current value is a charging current determined in consideration of the safety of the battery 106. The third current value is equal to or smaller than the first current value.

The connection switch 405 is a switch for connecting the battery connected via the first connection unit 107 to a power control unit 211 of the electronic device 100. When the connection switch 405 is turned on, the battery 106 supplies power to the power control unit 211. Assume that the connection switch 405 is in the ON state, an external device capable of supplying power is connected, and the connection switch 401 is in the ON state. In this case, the external device or the battery 106 can supply power to the power control unit 211. In addition, when the connection switch 405 is in the ON state and the connection switch 401 is in the OFF state, the battery 106 can supply power to the power control unit 211. The timer unit 404 measures the time from the start of charging with the charging current whose maximum value is the first current value.

Referring back to FIG. 2, the power control unit 211 supplies a required voltage to each unit in the electronic device 100 including the system control unit 207 for a required period based on an instruction from the power switch 105. A first voltage detecting unit 210 detects whether the voltage of the connected battery 106 is equal to or higher than a first predetermined value. The first predetermined value is a voltage which can activate the electronic device 100 and is set in advance in the first voltage detecting unit 210. Note that to activate the electronic device 100 is to allow the electronic device 100 to perform the battery authentication with respect to at least the battery connected to the system control unit 207. The first voltage detecting unit 210 can operate independently of the system control unit 207 even while the system control unit 207 is not activated. Upon detecting that the voltage of the battery 106 is equal to or higher than the first predetermined value, the first voltage detecting unit 210 outputs a signal for activating an authentication operation by the system control unit 207. A second voltage detecting unit 212 detects that the voltage of the connected battery 106 is equal to or higher than a second predetermined value. The second predetermined value is a voltage value indicating that the connected battery 106 is sufficiently charged. When the voltage of the battery 106 becomes equal to or higher than the second predetermined value, control is performed to stop charging of the battery 106 by the charge control unit 209. A notification unit 213 notifies the user that charging of the battery 106 is completed, charging of the battery 106 is stopped because of a charge operation failure, or the like.

Figure 3:
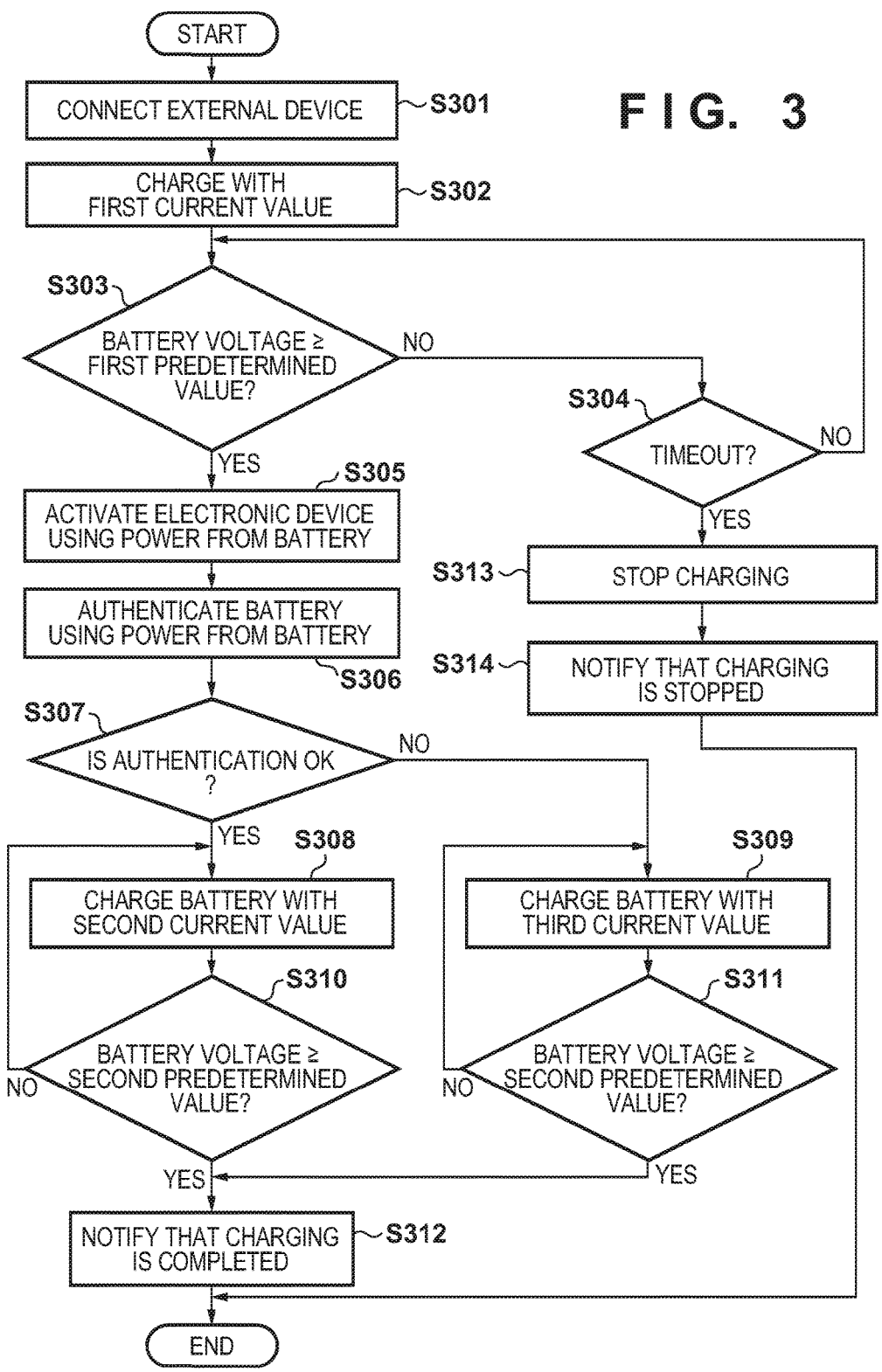
FIG. 3 is a flowchart illustrating an example of a first charge control method according to the first embodiment.

FIG. 3 is a flowchart illustrating an example of a charge control method that is performed when the electronic device 100 is connected to an external device via the second connection unit 108 and the battery 106 is charged by power supplied from the external device.

In step S301, an external device capable of supplying power is connected to the second connection unit 108.

In step S302, the controller 403 controls the current control unit 402 to control a current supplied from the external device to the charging current whose maximum value is the first current value, thereby charging the battery 106 connected to the first connection unit 107. At this time, the timer unit 404 starts to measure the time of charging with the charging current whose maximum value is the first current value.

In addition, the controller 403 turns on the connection switch 405 to also supply power to the power control unit 211. The power control unit 211 then supplies power from the external device to the system control unit 207. The system control unit 207 is standing by upon receiving power from the external device, and can start an authentication process in accordance with a signal from the first voltage detecting unit 210.

In step S303, the first voltage detecting unit 210 detects the voltage of the battery 106 connected to the first connection unit 107, and determines whether the detected voltage is equal to or higher than the first predetermined value.

If the voltage detected in step S303 is less than the first predetermined value (NO in step S303), the controller 403 calculates the cumulative time from the start of measurement by the timer unit 404 and compares the time with a predetermined period, thereby determining in step S304 whether a charge timeout has occurred. If a charge timeout has not occurred, the controller 403 continues to charge the battery 106 with the charging current whose maximum value is the first current value. The predetermined period is a time set in advance for the electronic device 100, and a time taken for the voltage value of the battery 106 to rise to the first predetermined value when the battery 106 in a discharged state is charged with the charging current whose maximum value is the first current value. If the voltage of the battery 106 does not reach the first predetermined value even after a lapse of a predetermined period since the start of charging of the battery 106 with a current equal to or smaller than the first current value, the controller 403 determines in step S304 that a charge timeout has occurred (YES in step S304). Upon determining in step S304 that a charge timeout has occurred, the controller 403 determines that the connected battery 106 cannot be charged. In step S313, the controller 403 stops charging the battery 106. In step S314, the system control unit 207 notifies, via the notification unit 213, the user that charging of the battery 106 is stopped. In step S312, the system control unit 207 notifies, via the notification unit 213, the user that charging of the battery 106 is completed.

If the voltage detected in step S303 is equal to or higher than the first predetermined value (YES in step S303), a signal from the first voltage detecting unit 210 is notified to the system control unit 207. The system control unit 207 is activated in accordance with this notification. In step S305, the system control unit 207 issues an instruction to the charge control unit 209 to supply power from the battery 106 to the system control unit 207. Upon receiving this instruction, the controller 403 in the charge control unit 209 limits an output from the current control unit 402 such that a voltage supplied from the external device via the second connection unit 108 becomes equal to or lower than the first predetermined value. With this control, power from the battery 106 is supplied to the power control unit 211 via the connection switch 405, and the system control unit 207 operates on power from the battery 106. In this manner, the system control unit 207 activates the electronic device 100 using power from the battery 106 connected to the first connection unit 107. The system control unit 207 then starts the battery authentication.

In step S306, the system control unit 207 authenticates whether the battery 106 is the predetermined battery, using power from the battery 106 connected to the first connection unit 107.

In step S307, the system control unit 207 determines whether the battery 106 connected to the first connection unit 107 is authenticated.

The charge control unit 209 receives a result of the battery authentication from the system control unit 207, and controls a charging current in accordance with the received battery authentication result. If the authentication of the battery 106 has succeeded (YES in step S307), in step S308, the controller 403 controls the current control unit 402 to charge the battery 106 with the charging current whose maximum value is the second current value. If the authentication of the battery 106 has failed (NO in step S307), in step S309, the controller 403 controls the current control unit 402 to charge the battery 106 with the charging current whose maximum value is the third current value.

In step S310, the second voltage detecting unit 212 determines whether the voltage of the connected battery 106 is equal to or higher than the second predetermined value. If the voltage of the battery 106 is less than the second predetermined value, the battery 106 is kept charged (NO in step S310). If the voltage of the battery 106 is equal to or higher than the second predetermined value, the second voltage detecting unit 212 notifies the system control unit 207 of the corresponding information (YES in step S310).

In step S311, the second voltage detecting unit 212 determines whether the voltage of the connected battery 106 is equal to or higher than the second predetermined value. If the voltage of the battery 106 is less than the second predetermined value, the battery 106 is kept charged (NO in step S311). If the voltage of the battery 106 is equal to or higher than the second predetermined value, the second voltage detecting unit 212 notifies the system control unit 207 of the corresponding information (YES in step S311).

Upon notifying that the voltage of the battery 106 is equal to or higher than the second predetermined value, the system control unit 207 notifies the charge control unit 209 that the voltage of the battery 106 has exceeded the second predetermined value, that is, charging is complete, in step S312. Upon receiving the notification of the completion of charging, the charge control unit 209 stops the charging operation with respect to the battery 106. In step S312, the system control unit 207 notifies, via the notification unit 213, the user that charging of the battery 106 is completed.

As described above, in the electronic device 100 according to the first embodiment, it is possible to stably authenticate the battery 106.

Second Embodiment

The second embodiment will be described next. According to the first embodiment, when the battery 106 is to be authenticated, the output voltage of the current control unit 402 was adjusted to the first predetermined value or lower to make the system control unit 207 operate on the battery 106. In the second embodiment, when the battery 106 is to be authenticated, the connection switch 401 is controlled in the OFF state to shut off power from the external device.

Figure 5:
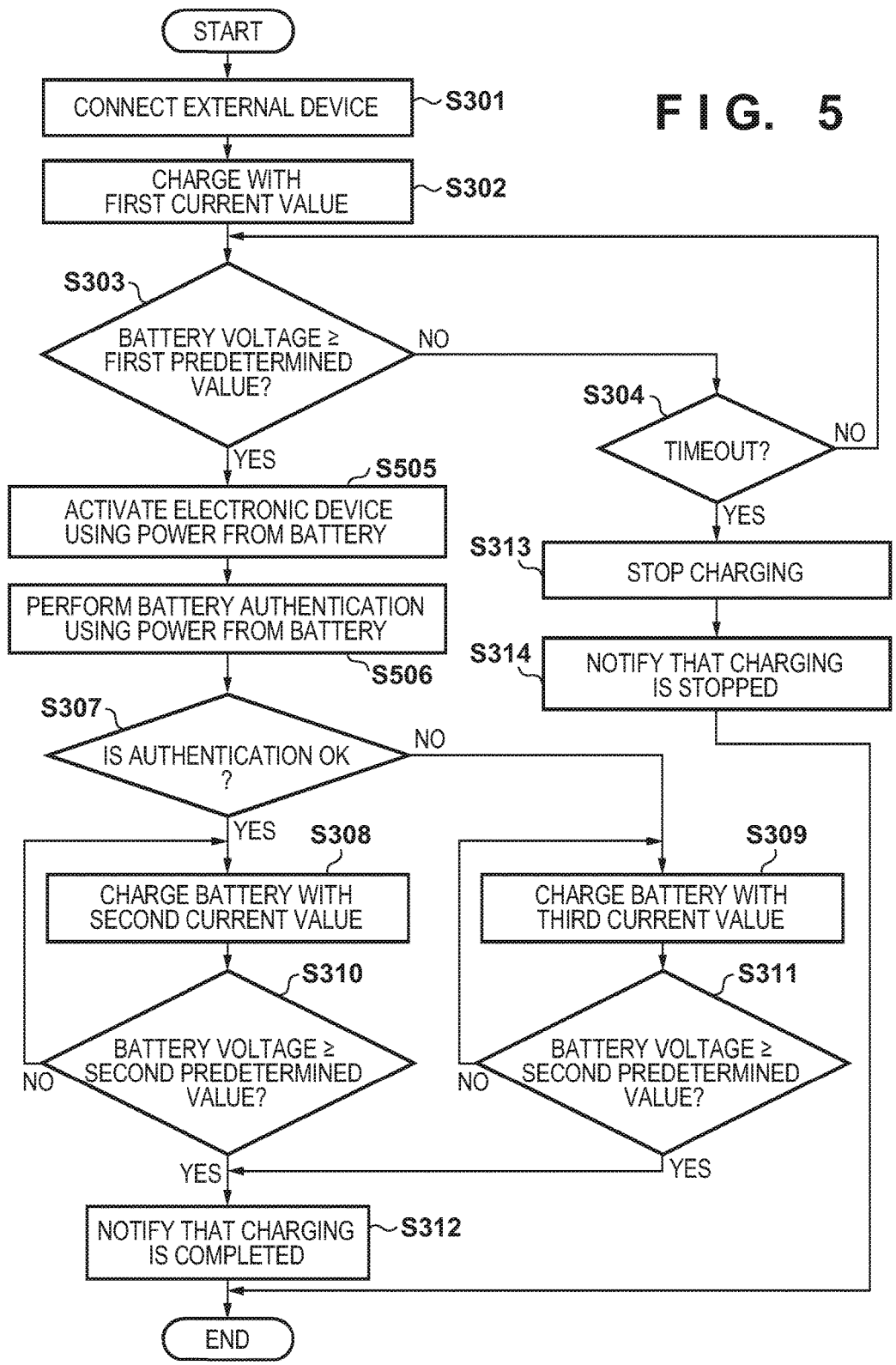
FIG. 5 is a flowchart illustrating an example of a second charge control method according to the second embodiment.

FIG. 5 is a flowchart illustrating an example of a charge control method that is performed when an external device is connected to the electronic device 100 via the second connection unit 108 and the battery 106 is charged by power supplied from the external device. Note that the outer appearance and arrangement of the electronic device 100 and the arrangement of the charge control unit 209 are the same as those in the first embodiment (see FIGS. 1, 2, and 4).

Referring to FIG. 5, steps S301 to S304 and steps S307 to S314 are the same as those in the first embodiment (FIG. 3).

In step S505, the controller 403 turns off the connection switch 401 to shut off power supplied from an external device, and turns on the connection switch 405 to cause the power control unit 211 to supply power from the battery 106. In this manner, the system control unit 207 activates the electronic device 100 using power from the battery 106 connected to a first connection unit 107, during power supplied from the external device being shut off by the connection switch 401.

In step S506, the system control unit 207 executes a battery authentication of the battery 106 using power from the battery 106 connected to the first connection unit 107, during power supplied from the external device being shut off by the connection switch 401. Thereby authenticating whether the battery 106 is a predetermined battery is performed.

As described above, according to the second embodiment, power supplied from an external device is shut off by the connection switch 401, and the battery authentication of the battery 106 is performed with power from the battery 106 connected to the electronic device 100, during power supplied from the external device being shut off by the connection switch 401. This makes it possible to eliminate the influence of power noise superimposed from the external device and stably authenticate the battery 106.

Third Embodiment

Various functions, processes, and methods described in the first and second embodiment can be implemented by a personal computer, microcomputer, CPU (central processing unit), or the like using programs. In the third embodiment, a personal computer, microcomputer, CPU (central processing unit), or the like will be referred to as "computer X". In addition, in the third embodiment, programs which are used to control the computer X and implement various functions, processes, and methods described with reference to the first and second embodiments will be referred to as "programs Y".

The computer X implements various functions, processes, and methods described in the first and second embodiments by executing the programs Y. In this case, the programs Y are supplied to the computer X via a computer-readable storage medium. The computer-readable storage medium according to the third embodiment includes at least one of a hard disk drive, magnetic storage device, optical storage device, magnetooptical storage device, memory card, volatile memory, nonvolatile memory, and the like. The computer-readable storage medium according to the third embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-201587, filed Oct. 9, 2015, which is hereby incorporated by reference herein in its entirety.

What is claimed is:

1. An electronic device comprising:
a detection unit that detects a voltage of a battery;
a charging unit that charges the battery with power from an external power source, wherein the charging unit charges the battery with a current not more than a predetermined current value until the voltage of the battery reaches a first predetermined value; and
an authentication unit that operates with power from the battery when the voltage of the battery has reached the first predetermined value while the charging unit is charging the battery with the current not more than the predetermined current value, and starts a battery authentication to determine whether the battery is a predetermined battery when the authentication unit is operated with the power from the battery, wherein the authentication unit does not perform the battery authentication while the charging unit is charging the battery with the current not more than the predetermined current value.

2. The electronic device according to claim 1, wherein the charging unit charges the battery with a current with a current value larger than the predetermined current value when the battery authentication performed by the authentication unit has succeeded.

3. The electronic device according to claim 1, wherein the charging unit charges the battery with a current with a current value not more than the predetermined current value when the battery authentication performed by the authentication unit has failed.

4. The electronic device according to claim 1, wherein the charging unit controls a voltage supplied from the external power source such that the voltage supplied from the external power source does not exceed the first predetermined value, when the voltage of the battery has reached the first predetermined value and the authentication unit operates with power from the battery.

5. The electronic device according to claim 1, further comprising a breaking unit that shuts off power from the external power source to the authentication unit when the voltage of the battery has reached the first predetermined value while the charging unit is charging the battery with the current not more than the predetermined current value.

6. The electronic device according to claim 1, wherein the charging unit stops charging the battery when the voltage of the battery has not reached the first predetermined value even after a lapse of a predetermined period while the charging unit is charging the battery with the current not more than the predetermined current value.

7. The electronic device according to claim 1, further comprising a notification unit that notifies a user that charging of the battery is stopped, when the voltage of the battery has not reached the first predetermined value even after a lapse of a predetermined period while the charging unit is charging the battery with the current not more than the predetermined current value and when the charging unit has stopped charging the battery.

8. A method executed by an electronic device, comprising:
  detecting a voltage of a battery;
  causing a charging unit to charge the battery with a current not more than a predetermined current value until the voltage of the battery reaches a first predetermined value, wherein the charging unit charges the battery with power from an external power source;
  causing an authentication unit to operate with power from the battery when the voltage of the battery has reached the first predetermined value while the charging unit is charging the battery with the current not more than the predetermined current value; and
  causing the authentication unit to start a battery authentication to determine whether the battery is a predetermined battery when the authentication unit is operated with the power from the battery, wherein the authentication unit does not perform the battery authentication while the charging unit is charging the battery with the current not more than the predetermined current value.

9. A non-transitory computer-readable storage medium that stores a program causing a computer to execute a method for an electronic device, the program comprising:
  code for detecting a voltage of a battery;
  code for causing a charging unit to charge the battery with a current not more than a predetermined current value until the voltage of the battery reaches a first predetermined value, wherein the charging unit charges the battery with power from an external power source;
  code for causing an authentication unit to operate with power from the battery when the voltage of the battery has reached the first predetermined value while the charging unit is charging the battery with the current not more than the predetermined current value; and
  code for causing the authentication unit to start a battery authentication to determine whether the battery is a predetermined battery when the authentication unit is operated with the power from the battery, wherein the authentication unit does not perform the battery authentication while the charging unit is charging the battery with the current not more than the predetermined current value.

10. The method according to claim 8, further comprising causing the charging unit to charge the battery with a current with a current value larger than the predetermined current value when the battery authentication performed by the authentication unit has succeeded.

11. The method according to claim 8, further comprising causing the charging unit to charge the battery with a current with a current value not more than the predetermined current value when the battery authentication performed by the authentication unit has failed.

12. The method according to claim 8, further comprising causing the charging unit to control a voltage supplied from the external power source such that the voltage supplied from the external power source does not exceed the first predetermined value, when the voltage of the battery has reached the first predetermined value and the authentication unit operates with power from the battery.

13. The method according to claim 8, further comprising causing a breaking unit to shut off power from the external power source to the authentication unit when the voltage of the battery has reached the first predetermined value while the charging unit is charging the battery with the current not more than the predetermined current value.

14. The method according to claim 8, further comprising causing the charging unit to stop charging the battery when the voltage of the battery has not reached the first predetermined value even after a lapse of a predetermined period while the charging unit is charging the battery with the current not more than the predetermined current value.

15. The method according to claim 8, further comprising notifying a user that charging of the battery is stopped, when the voltage of the battery has not reached the first predetermined value even after a lapse of a predetermined period while the charging unit is charging the battery with the current not more than the predetermined current value and when the charging unit has stopped charging the battery.

* * * * *